US012613695B2

(12) United States Patent
Weigand et al.

(10) Patent No.: US 12,613,695 B2
(45) Date of Patent: Apr. 28, 2026

(54) FUNCTION NAME RESOLUTION IN LIBRARY TRANSFORMATION ON SAME ARCHITECTURE

(71) Applicant: International Business Machines Corporation, Armonk, NY (US)

(72) Inventors: Ulrich Weigand, Tuebingen (DE); Frederik Johannes Hartmann, Sindelfingen (DE)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 18/355,441

(22) Filed: Jul. 20, 2023

(65) Prior Publication Data

US 2024/0427594 A1 Dec. 26, 2024

(30) Foreign Application Priority Data

Jun. 21, 2023 (GB) ...................................... 2309321

(51) Int. Cl.
*G06F 8/76* (2018.01)
(52) U.S. Cl.
CPC ...................................... *G06F 8/76* (2013.01)
(58) Field of Classification Search
CPC ........................................................ G06F 8/76
(Continued)

(56) References Cited

U.S. PATENT DOCUMENTS 5,408,665 A * 4/1995 Fitzgerald ............... G06F 8/433
707/999.01

5,560,013 A * 9/1996 Scalzi ................. G06F 9/45504
717/138
(Continued)

FOREIGN PATENT DOCUMENTS

WO        2016000550 A1      1/2016

OTHER PUBLICATIONS

International Searching Authority, "Notification of Transmittal of the International Search Report and the Written Opinion of the International Searching Authority, or Declaration," Patent Cooperation Treaty, Jun. 28, 2024, 13 pages, International Application No. PCT/EP2024/066146.

(Continued)

*Primary Examiner* — Wei Y Mui
*Assistant Examiner* — Amir Soltanzadeh
(74) *Attorney, Agent, or Firm* — Edward J. Wixted, III

(57) ABSTRACT

A computer-implemented method for transforming a library from a source operating system to a target operating system is disclosed. Thereby, the source operating system comprises an ABI, the target operating system comprising a target ABI, the target ABI being different from the source ABI, the library being implemented by a source object file that is compliant with the source application binary interface and comprising a source memory image, source symbol and source relocation information. The method comprises also creating a target memory image, that is compliant with the target application binary interface, wherein the target memory is derived from the source memory image, enriching the target memory image with an address information pointing to a variable length information, and writing the target memory image to the target object file to implement the transformed library by the target object file.

19 Claims, 7 Drawing Sheets

(58) Field of Classification Search
USPC ........................................................ 717/136
See application file for complete search history.

(56) References Cited

U.S. PATENT DOCUMENTS

| | | | |
|---|---|---|---|
| 10,152,313 B1 * | 12/2018 | Hartmann ................. | G06F 8/51 |
| 2004/0107416 A1 * | 6/2004 | Buban ..................... | G06F 8/656 |
| | | | 717/170 |
| 2011/0071814 A1 * | 3/2011 | Bohizic .............. | G06F 9/45554 |
| | | | 703/26 |
| 2015/0277867 A1 | 10/2015 | Hasabnis | |
| 2017/0039050 A1 * | 2/2017 | Eltsin ........................ | G06F 8/52 |
| 2018/0113687 A1 | 4/2018 | Gschwind | |
| 2020/0226009 A1 * | 7/2020 | Bachmutsky ......... | G06F 9/5038 |
| 2025/0306886 A1 * | 10/2025 | Sundaresan ............. | H04L 67/63 |

OTHER PUBLICATIONS

Foreign Search Report, Patents Act 1977: Search Report under Section 17(5), Application No. GB2309321.4, dated Feb. 2, 2024.

* cited by examiner

Figure 1:
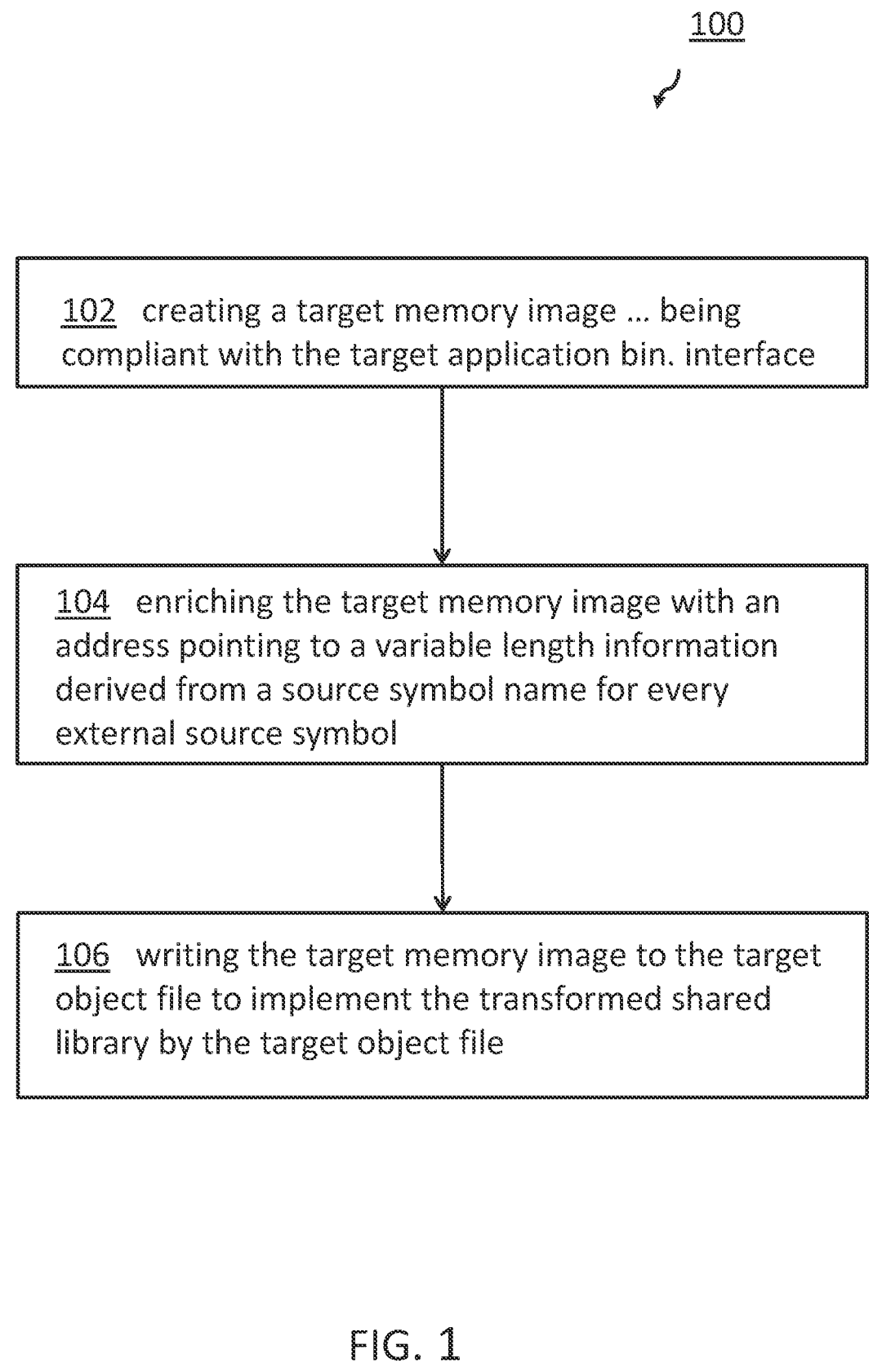

100

102   creating a target memory image ... being compliant with the target application bin. interface 104   enriching the target memory image with an address pointing to a variable length information derived from a source symbol name for every external source symbol 106   writing the target memory image to the target object file to implement the transformed shared library by the target object file

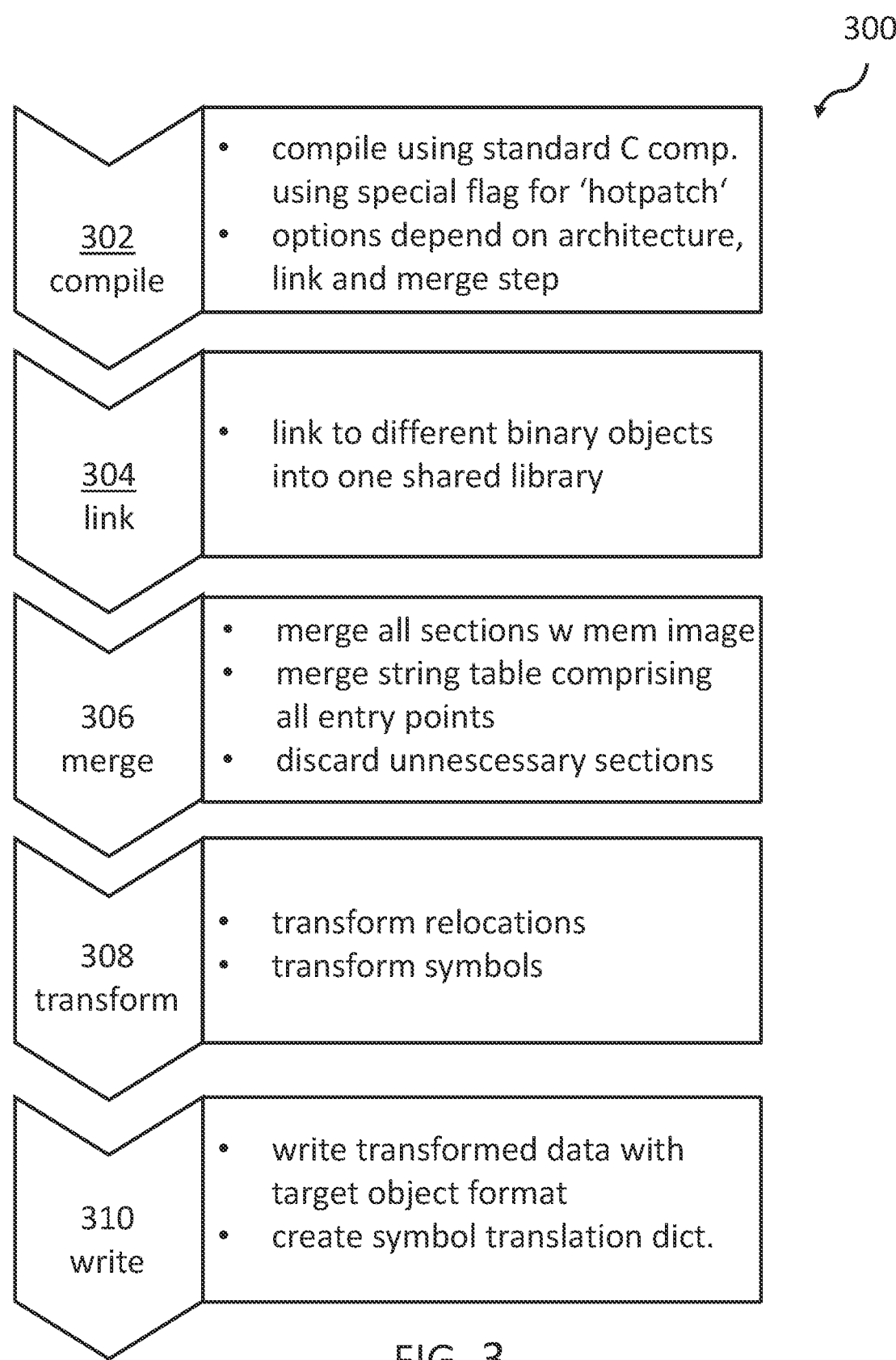

- 302
  compile
  - compile using standard C comp. using special flag for 'hotpatch'
  - options depend on architecture, link and merge step

- 304
  link
  - link to different binary objects into one shared library

- 306
  merge
  - merge all sections w mem image
  - merge string table comprising all entry points
  - discard unnescessary sections

- 308
  transform
  - transform relocations
  - transform symbols

- 310
  write
  - write transformed data with target object format
  - create symbol translation dict.

406 function binary code 402    stream of binary code 404
absolute
relocation 408
target symbol
address

| 410    full function name |
|---|
| output_function<br>fill_in_the_blancs_function<br>enter_new_inventor_function<br>  ...                ....... |

500

600
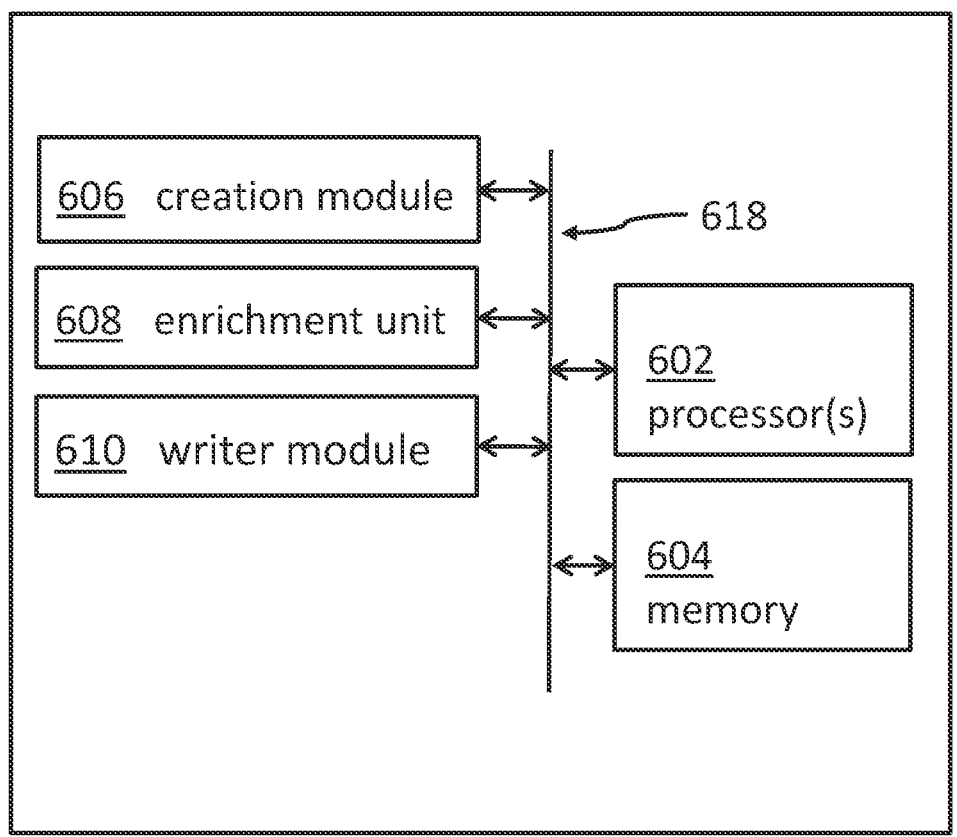
FIG. 6

700

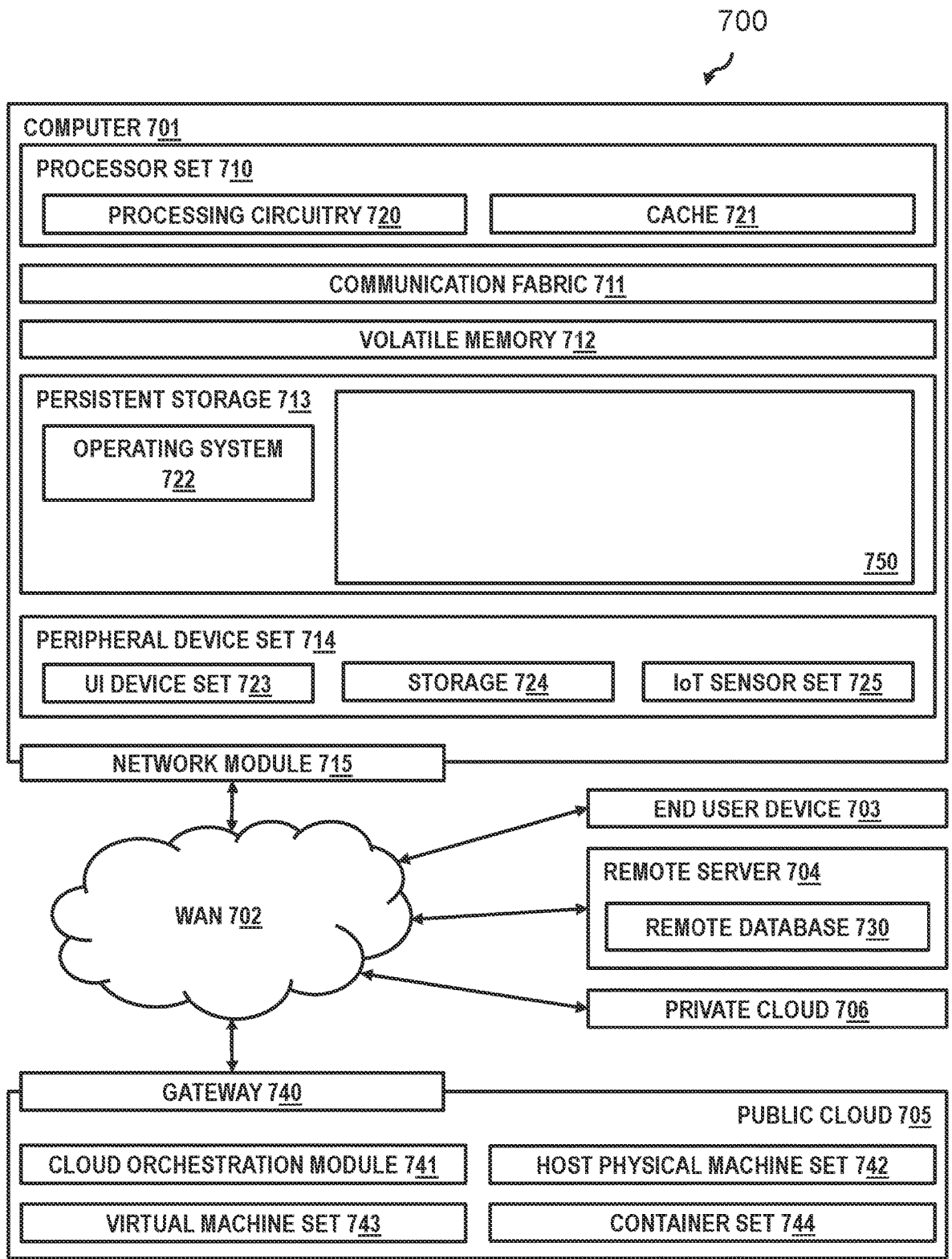

COMPUTER 701

PROCESSOR SET 710

PROCESSING CIRCUITRY 720          CACHE 721

COMMUNICATION FABRIC 711

VOLATILE MEMORY 712

PERSISTENT STORAGE 713

OPERATING SYSTEM 722

750

PERIPHERAL DEVICE SET 714

UI DEVICE SET 723          STORAGE 724          IoT SENSOR SET 725

NETWORK MODULE 715

WAN 702

END USER DEVICE 703

REMOTE SERVER 704

REMOTE DATABASE 730

PRIVATE CLOUD 706

GATEWAY 740

PUBLIC CLOUD 705

CLOUD ORCHESTRATION MODULE 741          HOST PHYSICAL MACHINE SET 742

VIRTUAL MACHINE SET 743          CONTAINER SET 744

FIG. 7

FUNCTION NAME RESOLUTION IN LIBRARY TRANSFORMATION ON SAME ARCHITECTURE

BACKGROUND

The invention relates generally to a transformation of a library from a source to a target operating system, and more specifically, to a computer-implemented method for transforming a library from a source operating system to a target operating system. The invention relates further to a related transformation system, and a related computer program product.

Today's IT (information technology) infrastructure, especially those in large enterprises and government organizations, have many legacy systems and deploy many legacy applications. For these systems and applications large amounts of the available IT budget is spent in a way that investments in new future-oriented systems may become difficult. As an example, the IBM operating system z/VM has a history of 50+ years written mainly in HLASM, PLX and C. Many programmer resources may no longer be active. Additionally, z/VM can currently only be compiled, assembled and linked on another z/VM system. Further, since the release of z/OS version 1.13, no contemporary C compiler support is available.

However, software development does not always take place on systems on which the software is later to be executed, e.g., software to be applied under a legacy operating system may be developed using a Linux-type development environment. Often, the operating system (OS) under which the new software is developed has an application binary interface (ABI) that does not match the ABI of the legacy OS on which it is to be deployed. For this reason, an object file that is compliant with the development ABI may be non-compliant with the deployment ABI. Additionally, the deployment system may be unsupportive of the current compilers, source code managers and/or object file formats of the development system, so an object file compliant with the target ABI may not be able to be created by compiling the source code on the deployment system without amendments to the source code and/or the deployment system. The same may apply to debugging tools for the executable code in the target OS environment. Therefore, it would be at least desirable to have a method for transforming an object file from the development operating system to the deployment operating system and also make the traditional debugging options available in the target or deployment operating system environment.

Some disclosures related to a computer-implemented method for transforming a library from a source operating system to a target operating system are available. For example, document US 2020/0226009 A1 discloses requesting execution of a workload by a next function with data transport overhead tailored based on memory sharing capabilities with the next function. Thereby, the data transport overhead consists of one or more of: sending a memory address pointer, virtual memory address pointer or sending data to the next function.

Additionally, document US 2017/0039050 A1 discloses techniques for binary translation. Thereby, a host platform receives a program for a guest platform different from the host. The program uses a set of shared objects or dynamically loaded libraries and is not compatible with the host platform. Thereby, the host platform determines whether the host platform has a corresponding shared object or dynamically loaded library that implements a common external interface with a specific shared object or dynamically loaded library from within the set.

However, none of the available technologies has a solution for a cross-system development having, e.g., z/VM as a target system in mind, in particular, not one that supports variable function name length on a legacy OS for tracking and debugging purposes.

SUMMARY OF THE INVENTION

According to one aspect of the present invention, a computer-implemented method for transforming a library from a source operating system to a target operating system may be provided. Thereby, the source operating system may comprise a source application binary interface, the target operating system may comprise a target application binary interface, the target application binary interface being different from the source application binary interface, the library being implemented by a source object file, and the source object file may be compliant with the source application binary interface and comprising at least a source memory image, source symbol information, and source relocation information.

The method may comprise creating a target memory image, wherein the target memory image is compliant with the target application binary interface, and wherein the target memory is derived from the source memory image, enriching the target memory image with an address information pointing to a variable length information derived from a source symbol name for every external source symbol, and writing the target memory image to the target object file to implement the transformed library by the target object file.

According to a further aspect of the present invention, a transformation system for a transformation of a library from a source operating system to a target operating system may be provided. Thereby, the source operating system may comprise a source application binary interface, the target operating system may comprise a target application binary interface, the target application binary interface being different from the source application binary interface, the library being implemented by a source object file, and the source object file may be compliant with the source application binary interface and comprises at least a source memory image, source symbol information, and source relocation information.

The system may comprise one or more processors and a memory operatively coupled to the one or more processors, wherein the memory stores program code portions which, when executed by the one or more processors, enable the one or more processors to create a target memory image, wherein the target memory image is compliant with the target application binary interface, and wherein the target memory is derived from the source memory image to enrich the target memory image with an address information pointing to a variable length information derived from a source symbol name for every external source symbol, and to write the target memory image to the target object file to implement the transformed library by the target object file.

In the following, additional embodiments of the inventive concept-applicable for the method as well as for the system-will be described.

According to an interesting embodiment of the method, the source relocation information may be free from relative relocation information. Having relative relocation information is typical for modern shared library technologies. Executable code of shared libraries may be moved back and forth in main memory without any effect on its executability. However, if the target/deployment environment does not allow relative location information in its executable files, it may be beneficial if the source object being transformed may be free from any relative relocation information.

According to an advantageous embodiment of the method, enriching the target memory image may be performed by placing address information into a target memory image location at a fixed offset from a target symbol address. This may be implemented by a supporting linker or by the transformation process. In particular, the supporting linker may be a source system linker. The source system linker may belong to the "translation units" used from the source code to the executable code, namely, a source compiler, a source linker, the transformation system or transformer executing the method proposed here, the target linker to generate the target executable. It may be noted that the compiler should be started with respective options or flags.

According to another advantageous embodiment of the method, the address information may comprise a relative offset representing a distance between the address information within the target memory image and the address of the corresponding variable length information within the target memory image.

According to another interesting embodiment of the method, the address information may comprise an absolute address. This way may be chosen because it may require the least amount of run-time calculations and because it is most easily used by dump analysis tools.

According to an advantageous embodiment, the method may comprise adding reserved memory for subsequent enrichment of the target memory image by reserving space in the source memory image at a fixed offset from a source symbol address. This additional reserved memory may have been added by a supporting compiler, for which—at compile time—the related option has been set. Because the target symbol may be a mangled or hashed function name—i.e., an effect of the transformation due to the limited size of target symbol sizes (e.g., 8 bytes)—the additionally placed address information may be used for pointers at which final address additional information about the target symbol may be stored, e.g., the full, original function name (as know from the source code).

According to a useful embodiment of the method, the enriching the target memory image may be performed by instructing a linker system to place an absolute address of the variable length information into the target memory image location with a fixed off-set from the target symbol address. Hence, if the software application crashes while running on the target OS, all information required for a successful trace analysis should be available directly in the target memory image. As mentioned above, the respective information and/or the required empty space in front of a target symbol address may have been created and placed by the supporting compiler into the target memory image.

According to another useful embodiment of the method, enriching the target memory image may be implemented by instructing the linker system (or simply, "linker") with instruction stored as relocation information in the target object file which may have been created with a supporting compiler called with specific options by adding absolute or absolute relocations into the source object file or by adding absolute relocations into the target object file by the transformation process.

According to an enhanced embodiment of the method, the enriching the target memory image may also comprise determining—in particular, before the enriching—that the target memory image location may have been created by a supporting compiler. Hence, even if a standard C compiler may be used, the proposed solution may be an add-on tool to the compiler in order to perform the required changes to the respective object file or to ensure that a later enrichment would not create a corrupted target memory image.

According to a preferred embodiment of the method, the determining may be performed by validating that the target memory image location only comprises a specific assembly instruction sequence. This may be a NOP operation ("no operation"), all-ZEROs, all-ONEs or similar.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered to be disclosed within this document.

The aspects defined above and further aspects of the present invention are apparent from the examples of embodiments to be described hereinafter and are explained with reference to the examples of embodiments to which the invention is not limited.

Preferred embodiments of the invention will be described, by way of example only, and with reference to the following drawings:

FIG. 1 shows a block diagram of an embodiment of the inventive computer-implemented method for transforming a library from a source operating system to a target operating system.

Figure 2:
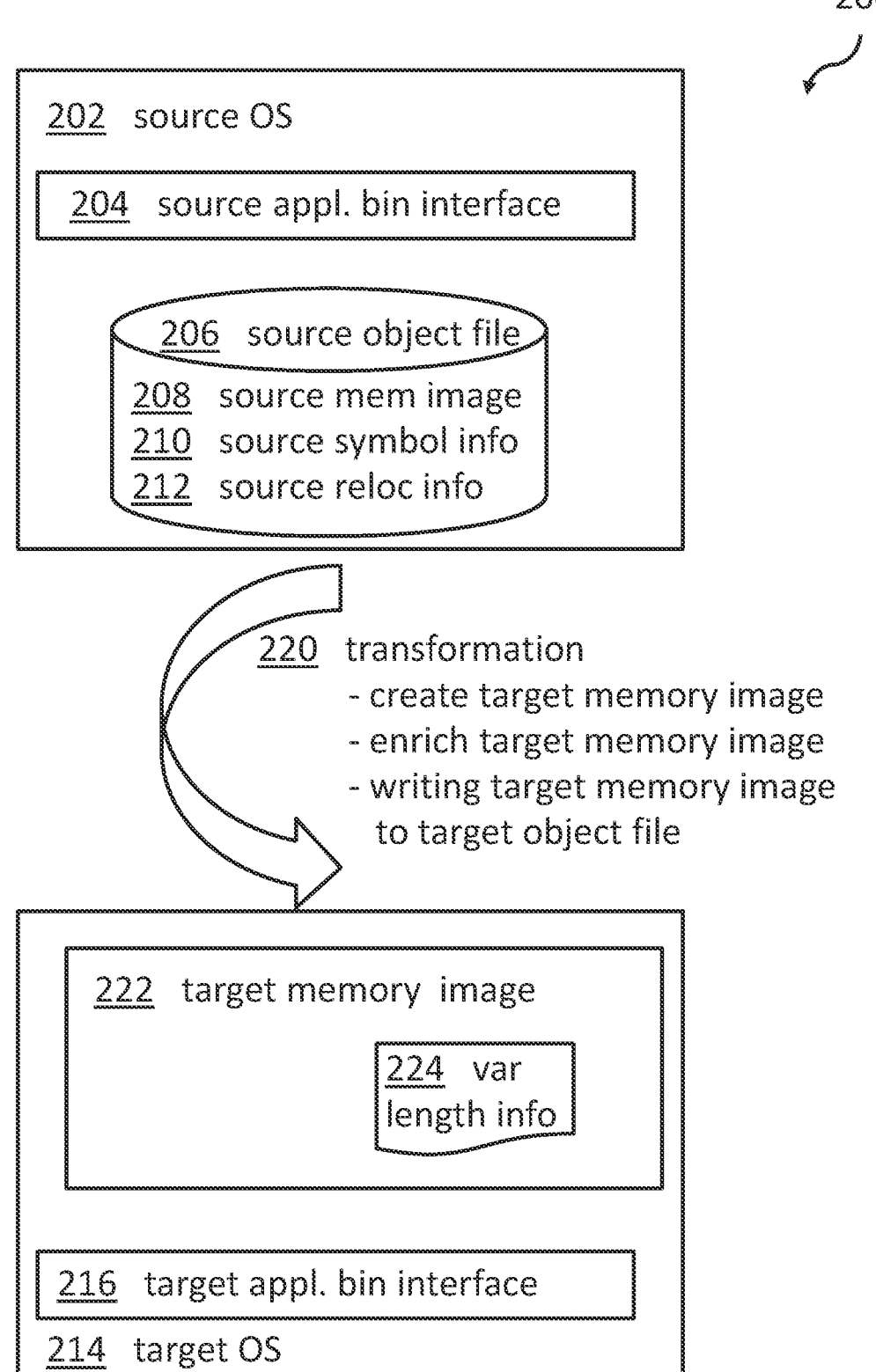

FIG. 2 shows a block diagram of an embodiment comprising instrumental components for the proposed solution.

FIG. 3 visualizes a diagram of a workflow for transforming, e.g., a library between two given exemplary platforms.

Figure 4:

FIG. 4 shows a diagram with a stream of binary code which also includes a function called.

Figure 5:
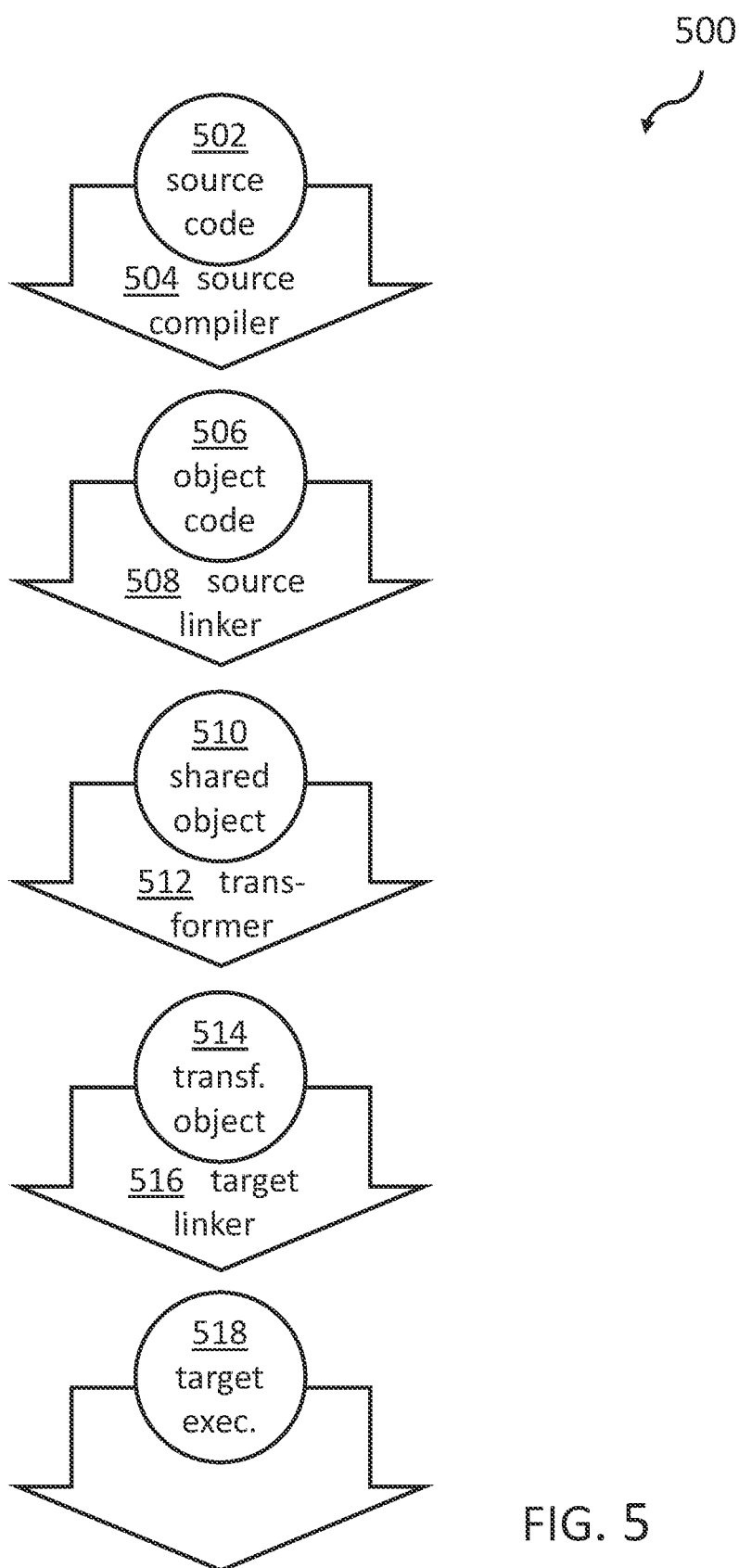

FIG. 5 shows a compiler linker pipeline used by the method proposed here.

FIG. 6 shows a block diagram of an embodiment of the inventive transformation system for transforming a library from a source operating system to a target operating system.

FIG. 7 shows an embodiment of a computing system comprising the system according to FIG. 6.

DETAILED DESCRIPTION

In the context of this description, the following technical conventions, terms and/or expressions may be used:

The term 'source operating system' may denote an operating system having a first application binary interface (ABI) that operates on a predefined hardware architecture. The source operating system may typically be used as a program development environment. Exemplary, it may be a Linux-type system, being operated on a z architecture hardware platform.

The term 'target operating system' may denote a second operating system having a second ABI incompatible to the first ABI. Hence, the feature sets of these ABIs might differ significantly such that even a conversion is not possible because the same relocation types may not exist on both OSs.

It may also be considered that the source and the target operating system may be two different virtual machines running on the same hardware, e.g., share the same process on the same memory of one computer system. Naturally, the computer system may be a hybrid implementation of the two described scenarios, e.g., the source and target operating system being two virtual machines running as two different processes or loads on one processor, but sharing one instance of memory on a given computer system.

The term 'application binary interface' (ABI) may denote a set of operating system functions that may be used and invoked by application programs. A platform ABI may define the layout and metadata of binary object formats that may be used by further applications or OS services. These binary objects may comprise, among other data, sections and segments that further comprise executable machine code, binary data and constants, symbol information, relocation information, etc. Therefore, the machine code and binary data and constants may be considered payload of the object. Relocation information, symbols, segments and segment definitions may be part of the metadata that are required to load the payload into memory for execution, or to enable further transformation and use of these objects. The machine code, binary data and constants may be directly dependent on the processor architecture of the computer system and may only be loosely coupled to the used operating system by the calling convention defined in the ABI.

The term 'source object file' may denote a compiled source code which may not yet be linked to executable code using operating system libraries.

The term 'target memory image' may also be denoted as a transformed binary image that may be the executable code compatible with the target operating system. In contrast, the 'source memory image' may denote the memory image available and executable in the deployment environment, i.e., usable by the source OS.

The term 'enriching the target memory image' may denote here to add information to an object file that was not part of the source memory image. A supportive compiler may add some space-denotable as 'hot patch area'-which may then be overwritten during the transformation process, either by a transformer or a source linker. The enrichment may then be a pointer in front of a function binary code. This pointer may point to a string table entry comprising the full name of the (original) function which code has been included in the shared object (compare FIG. 5).

The term 'source symbol' may denote a location within the source memory image, often being located at the beginning of the binary code of a function, a shared data area or some other place defined by the linker. The term 'source symbol name' may denote here the name of a source symbol, often the name of a function, data area or some other place.

The term 'relocation' may be a feature of an object file that enables assigning a load address to a particular portion of the object code. As used here, an absolute relocation may define the load address within a particular virtual address space defined for the object. A relative relocation, on the other hand, may be understood here as a load address definition relative to a given reference address within the virtual address space. Because (target) operating systems may exist whose ABI does not support relative relocations, providing the source object file free from relative relocation information may be a prerequisite for successfully performing a transformation. Thereby, a relocation record may be used to represent an instruction to a linker to replace a placeholder within that machine code of binary data with a relocation value that becomes known only at linking time. The relocation value may be related to the address of a symbol thereby, relocations may be separated into two main groups: absolute relocations that may refer to the address of that symbol, and relative relocations that may refer to the distance between the address of the symbol and the place-holder address.

The term 'library' may be used here to denote any object file or binary object which has been compiled such that a GOT (global offset table) and a PLT (procedure linkage table) are created. This may be done when compiling a shared library in the narrower sense, e.g., when creating an object that is intended to provide additional functionality to executable files or further shared object files at load time or run time. Hence, the present definition of a shared library may include, both, strictly shared library objects, and other objects compiled from source code that might originally have been intended to generate a different type of object (e.g., an executable object), which, however, is compiled in an analogous manner as normally the case when compiling a strict shared library. A library created this way may be free from relative relocations. A shared library—or generally, a library or any other binary object—may be a target for a transformation for which the here proposed concept may be beneficial, i.e., saving and making available the original function names of the source shared library also in the target memory image (or target executable code).

The term 'executable object' may denote objects that are intended for execution by a processor using an operating system. They may be built out of one or more relocatable objects with the help of the linker. Depending on the linker, they may comprise all symbols or only the necessary unde-fined symbols to find the functions in shared libraries. Since executable objects may have a fixed location in memory, they may comprise relative and absolute relocations (if supported by the target OS). Furthermore, a typical binary object may exist in three main groups: relocatable objects, executable objects, and shared libraries.

Before continuing with a detailed description of the figures, some relevant system environment characteristics shall be described. As already mentioned, software devel-opment may be performed on a modern computing envi-ronment allowing shared libraries; but the final deployment may be done on another computing environment not being compatible with the software development environment. Thus, the source OS is not compatible with the target OS and the source ABI (application binary interface) is not compat-ible with a target ABI. While a general solution for such a scenario is already available, traditional software develop-ment practices also require traditional, e.g., dump debugging as well as the ability for auto-name discovery during tracing when debugging.

The proposed computer-implemented method for trans-forming a library from a source operating system to a target operating system may offer multiple advantages, technical effects, contributions and/or improvements:

In particular, this may be true for the ability to support tracing and an easier usage of dump reading tools in the target OS environment because function names can now be tracked and clearly identified in the trace reports. In short, the solution may be based on including a strtab ELF sec-tion—i.e., a string table—in the transformed target memory image and adding pointers in hot patch areas in front of a function or other object's name. Additionally, relocations can be added if needed to resolve absolute pointers at a final link time.

This way, developers may track and trace software code now being written under an operating system environment (e.g., modern development OS) which is not the deployment operating system environment (e.g., legacy deployment OS).

Hence, software developers being used to the traditional way of software development on legacy operating systems may use traditional debugging tools although the required information to do so would normally not be available in the target memory image and also not in the target object files. The solution proposed here is advantageously closing this gap.

This way, modern software development environments may be used to develop software for more traditional software deployment environments and continue to make the traditional tools for debugging in the deployment OS environment available. Thus, it may be possible to keep the established software infrastructure provided by the target operating system in place for which the software is being developed. This may reduce the need for significant investments in updates and improvements to the target deployment system in order to support the modern software development environment. This may be especially beneficial for newly hired development staff where there is no need to fully comprehend the details of the target system model in order to develop the software library using a familiar and up-to-date development environment on a modern computing system. In particular, a modern software development environment may leverage well-known open source solutions that may not have been available by the time when the target operating system was released, but which a large number of developers are familiar with today. Hence, available resources—in particular, more traditional, extremely reliable computing environments and architectures—may be used without the need to reinvent all tools available in modern software development environments also for the traditional systems. This may help to save time, money and electric power and thus helps to protect the environment.

As a further advantageous aspect, one may also consider that added suggestions about runtime function name (self-) discovery via the already-mentioned pointers becomes elegantly possible.

Thus, for each function entry, usable bytes in front of each function call may be determined or counted, backwards from the function entry. Furthermore, it may be validated that the usable space (i.e., usable number of bytes) is bigger or equal to the size of e.g., eight bytes for an absolute relocation address. And an advantage form, the absolute relocation points to the full function name in a string table, i.e., in form of the strtab section in ELF (Executable and Linkable Format). This way, it may be guaranteed that the full name of the original function of the source code on the source system can be made available to any tracing tool used in the target operating system environment of the transformed object code. This solves the problem of mangled or hashed function names in the transformed object code.

Furthermore, embodiments may take the form of a related computer program product, accessible from a computer-usable or computer-readable medium providing program code for use by or in connection with a computer or any instruction execution system by or in connection with a computer or any instruction execution system. For the purpose of this description, a computer-usable or computer-readable medium may be any apparatus that may contain means for storing, communicating, propagating or transporting the program for use by or in connection, with the instruction execution system, apparatus, or device.

Now, tracing and using memory dump reading tools may require access to the full function names in order to be useful. If function names have been mangled or hashed during the transformation, traces cannot be used efficiently, i.e., the transformed function names do not mean anything to a developer. This may have been done during the transformation because of the limited amount of bits/bytes available for function names in the source OS environment. Hence, e.g., _func_ and other solutions aren't accessible outside of the source code (e.g., C source code) itself. Thus, they cannot be used for a dump or trace analysis in the target memory image.

In the following, a detailed description of the figures will be given. All instructions in the figures are schematic. Firstly, a block diagram of an embodiment of the inventive computer-implemented method for transforming a library from a source operating system to a target operating system is given. Afterwards, further embodiments, as well as embodiments of the transformation system for a transformation of a library from a source operating system to a target operating system will be described.

FIG. 1 shows a block diagram of a preferred embodiment of the computer-implemented method 100 for transforming a library from a source operating system to a target operating system. A typical case may be a transformation of a shared library—like in a Linux-type operating system—to a static library, like in a z/VM operating system.

The following prerequisites can be assumed for the source operating system—e.g., Linux—comprises a source application binary interface which shall be executable on a predetermined instruction set architecture (e.g., the z architecture). The target operating system—e.g., z/OS or z/VM—comprises the target application binary interface and may also be executable on the same predetermined instruction set architecture. The target application binary interface shall be different to the source application binary interface; the library is implemented by a source object file; the source object file is compliant with the source application binary interface, and it comprises at least a source memory image, source symbol information, and source relocation information.

Under these assumptions, the method 100 comprises creating, 102, a target memory image. Thereby, the target memory image is compliant with the target application binary interface, and the target memory is derived from the source memory image i.e., it comprises memory image data sourced from the source memory image.

The method 100 comprises enriching, 104, the target memory image with an address information pointing to a variable length information derived from a source symbol name for every external source symbol that is part of the target memory image. Last but not least, the method 100 comprises writing, 106, the target memory image to the target object file to implement the transformed shared library by the target object file.

FIG. 2 shows a block diagram 200 of an embodiment comprising instrumental components for the proposed solution. On the top of the figure, the source operating system 202 is shown comprising the source application binary interface 204. Also shown is the source object file 206 comprising the source memory image 208, the source symbol information 210 and the source relocation information 212.

A relocation may be a feature of an object file that enables assigning a load address to a particular portion of object code. As used here, an absolute relocation may define the load address within a particular virtual address space defined for the object. A relative relocation, on the other hand, may be understood here as a load address definition relative to a given reference address within the virtual address space. As (target) operating systems may exist whose ABI does not support relative relocations, providing the source object file free from relative relocation information may be a prerequisite for successfully performing a transformation.

At the bottom of the figure, the target operating system 214 with its target application binary interface 216 is shown. The transformation 220 is instrumental to create a target memory image comprising the pointer to the variable length information 224 for every external (source) symbol used by the target memory image 222. Hence, the transformation creates the target memory image, enriches it and writes the target memory image to the target object file. The pointer is helpful to overcome the limitations of the target operating system which may only be enabled to handle fixed length function names, i.e., external symbols.

FIG. 3 visualizes a diagram of a workflow 300 for transforming a shared library between two given exemplary platforms, i.e., from the development environment to the deployment environment. During the compile step 302, a C compiler (e.g., standard C11 compiler) is used to compile the source code of the software, e.g., the library code, to be deployed on the target system. Regardless of whether the software is intended to be deployed as an executable object, a library, or any other target format that can be used on the target system, the compiler is configured to treat the source code as a shared library, generating one or more binary objects alongside with a GOT (Global Offset Table) and PLTs (Procedure Linkage Table). The entire source code remains unaltered, and further compiler options are set as usual to reflect details of the architecture, the linking step and/or further desired traits of the resulting object files. To prepare and/or configure the merging step, additional compiler options and/or peculiarities of the linking steps that are required to create a shared library can be set if necessary.

During the linking step 304, the (standard) linker is used to link the different binary objects in one (shared) library. During this step the linker combines the binary object files into a single main object file and transforms the main object file into an absolute main object file that is free-of relative relocations.

During the merge step 306, the segments of the memory image of the absolute main object file are merged into a continuous memory image. This may be done by the linker by passing a linker script to the linker, or alternatively, a merging function of the transformation utility may be used to convert the segmented memory image into a continuous memory image. The merging step may be performed at link time or subsequent to the generation of the absolute main object file.

During the example shown in FIG. 3, the merging step (i.e., step 306) can also comprise the step of discarding unnecessary binary segments. This capability can be used to reduce the size of the memory image by leaving out, e.g., all segments that comprise neither memory image data nor any symbol or relocation information.

During the transformation step 308, the relocations and symbols comprised by the absolute main object file are transformed to fulfill the specifications of the target ABI. This may comprise mapping types, names, symbols and/or address spaces of the source information to the relocation types, naming conventions and/or address spaces required by the target ABI (Application Binary Interface). In some cases, a suitable feature of the target ABI may be selected to avoid or minimize conversion effort.

During the write step 310, the transformed memory image data, symbol information and relocation information are written to the target object file following the format and/or layout specifications of the target ABI. A target object header is generated for and included with the target object file. A symbol translation dictionary may be created in addition.

FIG. 4 shows a diagram 400 with a stream of binary code 402 which also includes an exemplary function binary call 406 (e.g., a subroutine). Due to the limited number of bytes for a function call identifier or name in the target operating system, the identifier may have been mangled or hashed so that it is no longer human-comprehendible in an easy way. However, in front of each symbol or integrated function binary code 406, a number of additionally usable bytes— e.g., eight bytes (or any other sufficient number of bytes)—is reserved for an absolute relocation pointer 404. The pointer at 404, just in front of the target symbol address 408, points to an absolute address in the target memory image (outside of the core executable code), e.g., to the start address of a string table storing the full original function names 410 of the source code. This way, tracing and debugging tools of a deployment environment may have access to the clear text or full function name 410.

FIG. 5 shows a compiler/linker pipeline 500 usable by the method proposed here. It starts with the source code 502 which is used as input for the source compiler 504 in the source/development environment. The source compiler 504 outputs the object code 506. One or more object code elements 506 are linked by the source linker 508 to produce a shared object 510. Optionally, this undergoes the transformation of the transformer 512, as proposed here. Alternatively, the transformation could also be performed by an extended source linker 508. Next, the output of the transformer 512 (or the extended source linker) is directed to the target linker 516 which uses the transformed object 514 as input to produce the target executable 518. This can then be loaded to the target system under the target OS.

FIG. 6 shows a block diagram of an embodiment of the transformation system 600 for a transformation of a library from a source operating system to a target operating system. The already mentioned assumptions may be repeated here again: The source operating system—e.g., Linux—comprises a source application binary interface that shall be executable on a predetermined instruction set architecture (e.g., z architecture). The target operating system—e.g., z/OS or z/VM—comprises the target application binary interface and may also be executable on the same predetermined instruction set architecture. The target application binary interface shall be different to the source application binary interface; the library is implemented by a source object file; the source object file is compliant with the source application binary interface, and it comprises at least a source memory image, source symbol information, and source relocation information.

The system 600 comprises at least one or more processors 602 and a memory 604 operatively coupled to the one or more processors 602, wherein the memory 604 stores program code portions which, when executed by the one or more processors 602, enable the one or more processors 602 to create—in particular by a creation module 606—a target memory image, where the target memory image is compliant with the target application binary interface, and where the target memory is derived from the source memory image.

Additionally, the one or more processors 602 are also enabled to enrich—in particular by an enrichment unit 608—the target memory image with an address information pointing to a variable length information derived from a source symbol name for every external source symbol, and to write—in particular using the writer module 610—the target memory image to the target object file to implement the transformed shared library by the target object file.

It shall also be mentioned that all functional units, modules and functional blocks—the one or more processors 602, the memory 604, the creation module 606, the enrichment unit 608 and the writer module 610—may be communicatively coupled to each other for signal or message exchange in a selected 1:1 manner. Alternatively, the functional units, modules and functional blocks can be linked to a system internal bus system 618 for a selective signal or message exchange.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment (CPP embodiment or CPP) is a term used in the present disclosure to describe any set of one, or more, storage media (also called mediums) collectively included in a set of one, or more, storage devices that collectively include machine readable code corresponding to instructions and/or data for performing computer operations specified in a given CPP claim. A storage device is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, defragmentation, or garbage collection, but this does not render the storage device as transitory because the data is not transitory while it is stored.

FIG. 7 shows a computing environment 700 comprising an example of an environment for the execution of at least some of the computer code involved in performing the inventive methods, such as the computer-implemented method for transforming a library from a source operating system to a target operating system, 750.

In addition to block 750, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 750, as identified above), peripheral device set 714 (including user interface (UI), device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip." In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 750 in persistent storage 713.

COMMUNICATION FABRIC 711 is the signal conduction paths that allow the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, the volatile memory is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface type operating systems that employ a kernel. The code included in block 750 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (e.g., embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

It should also be mentioned that the transformation system 600 (compare FIG. 6) for a transformation a library from a source operating system to a target operating system can be an operational sub-system of the computer 701 and may be attached to a computer-internal bus system.

The terminology used herein is for the purpose of describing particular embodiments only and is not intended to limit the invention. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method comprising:
transforming, by one or more processors, a library from a source operating system to a target operating system, wherein:
the source operating system comprises a source application binary interface;
the target operating system comprises a target application binary interface;
the target application binary interface is different than the source application binary interface;
the target operating system is only enabled to handle fixed length function names;
the library is implemented by a source object file, the source object file (i) being compliant with the source application binary interface and (ii) comprising at least a source memory image, source symbol information, and source relocation information; and
transforming the library from the source operating system to the target operating system comprises:
creating, by one or more processors, a target memory image, wherein:
the target memory image is compliant with the target application binary interface; and
the target memory image is derived from the source memory image;
enriching, by the one or more processors, the target memory image with address information pointing to a variable length information derived from a source symbol name for every external source symbol, wherein:
the enriching is performed by placing a pointer into a target memory image location at a fixed offset from a target symbol address; and
the pointer points to a start address of a table storing full original function names from source code; and
writing, by the one or more processors, the target memory image to a target object file to implement a transformed shared library by the target object file.

2. The computer-implemented method of claim 1, wherein the source relocation information is free from relative relocation information.

3. The computer-implemented method of claim 1, wherein the address information comprises a relative offset representing a distance between the address information within the target memory image and an address of the variable length information within the target memory image.

4. The computer-implemented method of claim 1, wherein the address information comprises an absolute address.

5. The computer-implemented method of claim 1, further comprising:

adding, by one or more processors, reserved memory for a subsequent enrichment of the target memory image by reserving space in the source memory image at a fixed offset from a source symbol address.

6. The computer-implemented method of claim 4, wherein the enriching further comprises instructing a linker system to place an absolute address of the variable length information into the target memory image location at the fixed offset from the target symbol address.

7. The computer-implemented method of claim 6, wherein the instructing is based on an instruction stored as relocation information in the target object file.

8. The computer-implemented method of claim 1, wherein the enriching further comprises determining, by one or more processors, that the target memory image location has been created by a supporting compiler.

9. The computer-implemented method of claim 8, wherein the determining further comprises validating, by one or more processors, that the target memory image location only comprises a specific assembly instruction sequence.

10. A computer system comprising:

a processor set;

one or more computer-readable storage media; and program instructions stored on the one or more computer-readable storage media to cause the processor set to perform operations comprising:

transforming a library from a source operating system to a target operating system, wherein:

the source operating system comprises a source application binary interface;

the target operating system comprises a target application binary interface;

the target application binary interface is different than the source application binary interface;

the target operating system is only enabled to handle fixed length function names;

the library is implemented by a source object file, the source object file (i) being compliant with the source application binary interface and (ii) comprising at least a source memory image, source symbol information, and source relocation information; and transforming the library from the source operating system to the target operating system comprises:

creating a target memory image, wherein:

the target memory image is compliant with the target application binary interface; and the target memory image is derived from the source memory image;

enriching the target memory image with address information pointing to a variable length information derived from a source symbol name for every external source symbol, wherein:

the enriching is performed by placing a pointer into a target memory image location at a fixed offset from a target symbol address; and the pointer points to a start address of a table storing full original function names from source code; and writing the target memory image to a target object file to implement a transformed shared library by the target object file.

11. The computer system of claim 10, wherein the source relocation information is free from relative relocation information.

12. The computer system of claim 10, wherein the address information comprises a relative offset representing a distance between the address information within the target memory image and an address of the variable length information within the target memory image.

13. The computer system of claim 10, wherein the address information comprises an absolute address.

14. The computer system of claim 10, wherein the operations further comprise:

adding reserved memory for a subsequent enrichment of the target memory image by reserving space in the source memory image at a fixed offset from a source symbol address.

15. The computer system of claim 14, wherein the enriching further comprises instructing a linker system to place an absolute address of the variable length information into the target memory image location at the fixed offset from the target symbol address.

16. The computer system of claim 15, wherein the instructing is based on an instruction stored as relocation information in the target object file.

17. The computer system of claim 10, wherein the enriching further comprises determining that the target memory image location has been created by a supporting compiler.

18. A computer program product comprising:

one or more computer-readable storage media; and program instructions stored on the one or more computer-readable storage media to perform operations comprising:

transforming a library from a source operating system to a target operating system, wherein:

the source operating system comprises a source application binary interface;

the target operating system comprises a target application binary interface;

the target application binary interface is different than the source application binary interface;

the target operating system is only enabled to handle fixed length function names;

the library is implemented by a source object file, the source object file (i) being compliant with the source application binary interface and (ii) comprising at least a source memory image, source symbol information, and source relocation information; and transforming the library from the source operating system to the target operating system comprises:

creating a target memory image, wherein:

the target memory image is compliant with the target application binary interface; and the target memory image is derived from the source memory image;

enriching the target memory image with address information pointing to a variable length information derived from a source symbol name for every external source symbol, wherein:

the enriching is performed by placing a pointer into a target memory image location at a fixed offset from a target symbol address; and the pointer points to a start address of a table storing full original function names from source code; and writing the target memory image to a target object file to implement a transformed shared library by the target object file.

19. The computer-implemented method of claim 1, wherein the table is a string table.

* * * * *